US012584847B2

(12) United States Patent
Cote et al.

(10) Patent No.: US 12,584,847 B2
(45) Date of Patent: Mar. 24, 2026

(54) METHODS, SYSTEMS, AND DEVICES FOR ELECTROMAGNETICALLY SHIELDED PARAMAGNETIC BEAD ANALYSIS

(71) Applicant: IDEXX Laboratories, Inc., Westbrook, ME (US)

(72) Inventors: Jennifer Cote, Westbrook, ME (US); Kevin Chamberland, Westbrook, ME (US); Murthy Yerramilli, Westbrook, ME (US)

(73) Assignee: IDEXX LABORATORIES, INC, Westbrook, ME (US)

( * ) Notice: Subject to any disclaimer, the term of this patent is extended or adjusted under 35 U.S.C. 154(b) by 181 days.

(21) Appl. No.: 18/606,440

(22) Filed: Mar. 15, 2024

(65) Prior Publication Data

US 2024/0328922 A1     Oct. 3, 2024

Related U.S. Application Data

(60) Provisional application No. 63/490,331, filed on Mar. 15, 2023.

(51) Int. Cl.
    *G01N 15/14*        (2024.01)
    *G01N 15/1434*     (2024.01)
              (Continued)
(52) U.S. Cl.
    CPC ......... *G01N 15/1434* (2013.01); *G06V 10/14* (2022.01); *G06V 10/443* (2022.01)
(58) Field of Classification Search
    CPC ........... G01N 15/1434; G01N 15/1425; G01N 15/1459; G01N 15/147; G01N 15/149;
              (Continued)

(56) References Cited

U.S. PATENT DOCUMENTS 6,329,139 B1    12/2001    Nova et al.
7,745,091 B2     6/2010    True
               (Continued)

FOREIGN PATENT DOCUMENTS

WO     WO2021041709      3/2021

OTHER PUBLICATIONS

International Search Report received in International Application No. PCT/US2024/20129 mailed on Jun. 28, 2024 (2 pages).
(Continued)

*Primary Examiner* — Don K Wong

(74) *Attorney, Agent, or Firm* — McDonell Boehnen Hulbert & Berghoff LLP

(57) ABSTRACT

A system for analyzing a plurality of particles is disclosed. The system includes a platform structurally configured to support container, a reader, a shield, one or more processors, and a non-transitory, computer-readable medium storing instructions that, when executed by the one or more processors, cause the system to perform a set of operations comprising: analyzing, via the reader, a plurality of particles in the container, the plurality of particles comprising at least one paramagnetic, identifiable bead, in the container, wherein analyzing the plurality of particles comprises performing one or more assay procedures on the plurality of particles and, during the one or more assay procedures, determining a parameter of the plurality of particles.

20 Claims, 5 Drawing Sheets

(51) Int. Cl.
    *G06V 10/14*        (2022.01)
    *G06V 10/44*        (2022.01)
(58) Field of Classification Search
    CPC ... G01N 2015/0288; G01N 2015/1493; B82Y
                            255/00; G06V 10/14
    See application file for complete search history.

(56) References Cited

U.S. PATENT DOCUMENTS

| | | |
|---|---|---|
| 8,148,139 B2 | 4/2012 | Ho |
| 8,614,852 B2 | 12/2013 | Kersey et al. |
| 2018/0292319 A1 | 10/2018 | Battrell et al. |
| 2023/0111548 A1* | 4/2023 | Ivanov ............... G01N 15/1459 |
| | | 422/68.1 |

OTHER PUBLICATIONS

International Search Report received in International Application No. PCT/US2024/20129 mailed on Jun. 28, 2024 (7 pages).

* cited by examiner

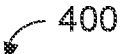

402 Imaging a plurality of particles in a container, wherein the plurality of particles comprises at least one paramagnetic, identifiable bead

404 Analyzing, via a reader, the plurality of particles in the container, wherein analyzing the plurality of particles comprises performing one or more assay procedures on the plurality of particles and, during the one or more assay procedures, determining a parameter of the plurality of particles, and wherein a shield at least partially surrounds the reader and the container, and wherein the shield comprises a material that restricts transmission of electromagnetic waves through the shield

Fig. 4

METHODS, SYSTEMS, AND DEVICES FOR ELECTROMAGNETICALLY SHIELDED PARAMAGNETIC BEAD ANALYSIS

FIELD OF THE DISCLOSURE

The present disclosure involves systems and methods for analyzing a plurality of particles. Namely, devices and methods of the disclosure manipulate (e.g., transport, immobilize, etc.) a plurality of particles and analyze the plurality of particles to identify a parameter (e.g., a unique identifying feature) of the plurality of particles and/or a component thereof (e.g., at least one paramagnetic, identifiable bead).

BACKGROUND

Assays (including immunoassays) and other analytical evaluations (e.g., polymerase chain reaction (PCR) tests) can be conducted on one or more portions of a sample utilizing a variety of different methods, including by utilizing a plurality of particles (e.g., paramagnetic, identifiable beads) and other components (e.g., solution) mixed with the sample to assist in performing the assays and other analytical evaluations.

SUMMARY

In some examples, a plurality of particles (e.g., paramagnetic, identifiable beads), can be suspended within a solution that can be used for testing and identification of components in the solution and/or a portion thereof (e.g., a droplet of the solution).

In some instances, if the solution contains beads that have paramagnetic qualities, then outside influences and/or forces (e.g., external magnetic and/or electromagnetic forces) may interfere with the beads and the solution cause the beads to behave in a manner that is not optimal for analysis, which in turn can impact the accuracy and precision of any test results for which the solution may be used. Accordingly, currently solution testing is subject to variability and, thus, the accuracy and precision of any associated test results are degraded accordingly.

In an example, a system is described for analyzing a plurality of particles. The system comprises a platform structurally configured to support a container, a reader, a shield, one or more processors, and a non-transitory, computer-readable medium storing instructions that, when executed by the one or more processors, cause the system to perform a set of operations comprising: manipulating the plurality of particles in the container, wherein the plurality of particles comprises at least one paramagnetic, identifiable bead and analyzing, via the reader, the plurality of particles in the container, wherein analyzing the plurality of particles comprises performing one or more assay procedures on the plurality of particles and, during the one or more assay procedures, determining a parameter of the plurality of particles. The shield of the disclosed system further comprises a material that restricts transmission of electromagnetic waves through the shield, and wherein the shield at least partially surrounds the platform, the container, and the reader.

In another example, a method for analyzing a plurality of particles is described. The method comprises manipulating a plurality of particles in a container, wherein the plurality of particles comprises at least one paramagnetic, identifiable bead and analyzing, via a reader, the plurality of particles in the container, wherein analyzing the plurality of particles comprises performing one or more assay procedures on the plurality of particles and, during the one or more assay procedures, determining a parameter of the plurality of particles, and wherein a shield at least partially surrounds the container and the reader, and wherein the shield comprises a material that restricts transmission of electromagnetic waves through the shield.

In another example, a non-transitory computer-readable medium is described, having stored thereon program instructions that, upon execution by a controller cause a controller to perform a set of operations. The set of operations comprises manipulating a plurality of particles in a container, wherein the plurality of particles comprises at least one paramagnetic, identifiable bead and analyzing, via a reader, the plurality of particles in the container, wherein analyzing the plurality of particles comprises performing one or more assay procedures on the plurality of particles and, during the one or more assay procedures, determining a parameter of the plurality of particles, and wherein a shield at least partially surrounds the container and the reader, and wherein the shield comprises a material that restricts transmission of electromagnetic waves through the shield.

The features, functions, and advantages that have been discussed can be achieved independently in various examples or may be combined in yet other examples. Further details of the examples can be seen with reference to the following description and drawings.

BRIEF DESCRIPTION OF THE FIGURES

The above, as well as additional features will be better understood through the following illustrative and non-limiting detailed description of example embodiments, with reference to the appended drawings.

FIG. 4 illustrates a method, according to an example embodiment.

Figure 1:
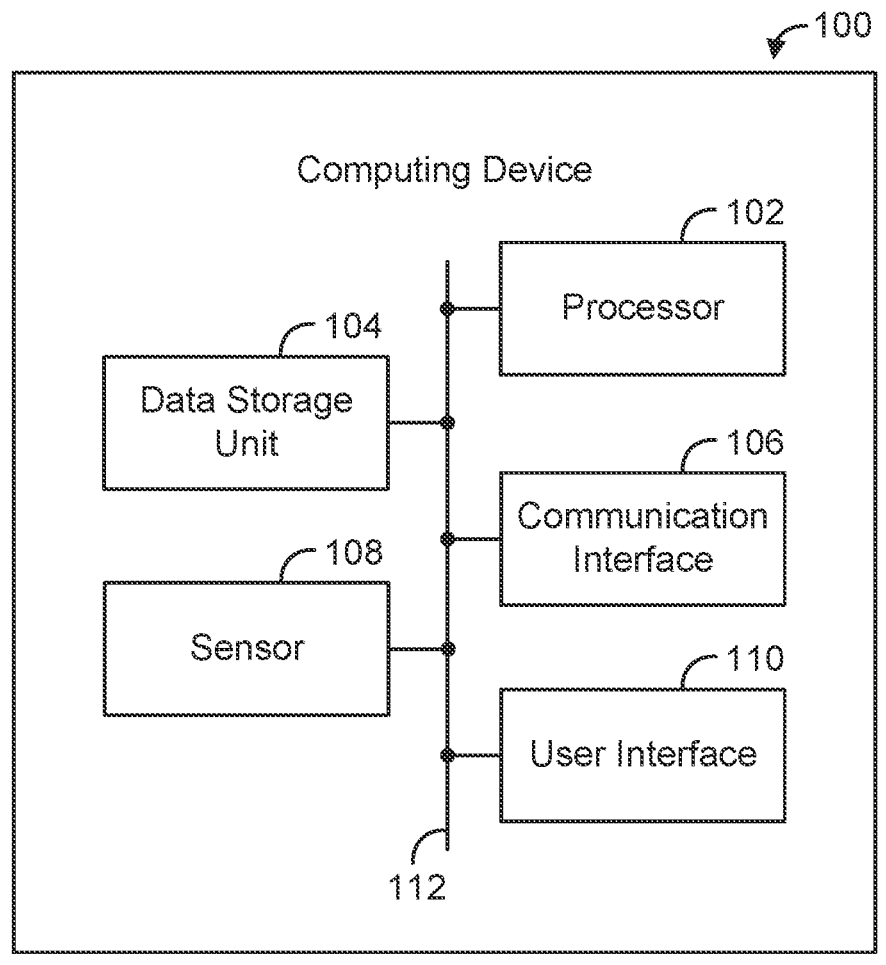
FIG. 1 illustrates a simplified block diagram of an example computing device, according to an example embodiment.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Within examples, the disclosure is directed to systems, devices, and methods for analyzing a plurality of particles (e.g., one or more types of paramagnetic, identifiable beads) containing one or more identifying features (such as a unique bar code, a color, a shape, an alphanumeric symbol, and/or the like). These particles include one or more of the following: microbeads, microparticles, micropellets, microwafers, microparticles containing one or more identifying features (such as a bar code, a color, a shape, an alphanumeric symbol, and/or the like), paramagnetic microparticles, paramagnetic microparticles containing one or more bar codes, and/or beads containing one or more nickel bar codes. Moreover, the particles may be magnetic or paramagnetic. Particles suitable for use in the disclosure are capable of attachment to other substances such as derivatives, linker molecules, proteins, nucleic acids, or combinations thereof. The capability of the particles to be attached to other substances can result from the particle material as well as from any further surface modifications or functionalization of the particle. The particles can be functionalized or be capable of becoming functionalized in order to covalently or non-covalently attach proteins, nucleic acids, linker molecules or derivatives as described herein.

For example, the surface of these particles (e.g., paramagnetic, identifiable beads), can be modified or functionalized with amine, biotin, streptavidin, avidin, protein A, sulfhydryl, hydroxyl and carboxyl. These particles may be spherical or other shapes, may be light transmissive and may be digitally coded such as for example, by an image that provides for high contrast and high signal-to-noise optical detection to facilitate identification of the bead. To the extent an image is present, the image may be implemented by a physical structure having a pattern that is partially substantially transmissive (e.g., transparent, translucent, and/or pervious to light), and partially substantially opaque (e.g., reflective and/or absorptive to light) to light. The pattern of transmitted light is determined (e.g., by scanning or imaging), and the code represented by the image on the coded bead can be decoded. Various code patterns, such as circular, square, or other geometrical shapes, can be designed as long as they can be recognized by an optical decoder. Examples of these one or more types of particles may be found at: U.S. Pat. Nos. 7,745,091, 8,148,139, and 8,614,852.

Additionally or alternatively, these particles (e.g., paramagnetic, identifiable beads) may comprise one or more materials, including one or more of the following: glass, polymers, polystyrene, latex, elemental metals, ceramics, metal composites, metal alloys, silicon, or of other support materials such as agarose, ceramics, glass, quartz, polyacrylamides, polymethyl methacrylates, carboxylate modified latex, melamine, and Sepharose, and/or one or more hybrids thereof. In particular, useful commercially available materials include carboxylate modified latex, cyanogen bromide activated Sepharose beads, fused silica particles, isothiocyanate glass, polystyrene, and carboxylate monodisperse microspheres. Furthermore, these particles also comprise one or more specific shapes, dimensions, and/or configurations and may be modified for one or more specific uses. For example, these particles (e.g., paramagnetic, bar-coded beads) may be a variety of sizes from about 0.1 microns to about 100 microns in diameter, for example about 0.1, 0.5, 1.0, 5, 10, 20, 30, 40 50, 60, 70, 80 90 or 100 microns in diameter. In a further aspect, these particles may be surface modified and/or functionalized with biomolecules for use in biochemical analysis.

The particles of the disclosure may be used in various homogenous, sandwich, competitive, or non-competitive assay formats to generate a signal that is related to the presence or amount of an analyte in a test sample. The term "analyte," as used herein, generally refers to the substance, or set of substances in a sample that are detected and/or measured, either directly or indirectly. In various aspects the assays of the disclosure, examples include sandwich immunoassays that capture an analyte in a sample between a first binding member (e.g., antibody) attached to the particles and a second binding member for the analyte that is associated with a label. In another example embodiment, the binding member on the particles may be an antigen (e.g., protein) that binds an antibody of interest in a patient sample in order to capture the antibody on the particle. The presence of the antibody can then be detected with a label conjugated to a second binding member specific for an antibody. The second binding member attached to the label may be the antigen conjugated to the label or the binding member may itself be an antibody (e.g., anti-species antibody) that is conjugated the label. In example embodiments, these characteristics may be referred to herein as a "unique identifying feature" and/or "parameter" of the particles and/or of droplet in which the particles reside. Other examples are possible. For example, the particles may also bind to a fluorescent tag or label, which may present a "unique identifying feature" and/or "parameter" of particles to which the fluorescent tag or label might bind under a fluorescent and/or ultraviolet lighting.

In another example embodiment, the testing protocols of the disclosure are assays, including competitive immunoassays for detection of antibody in the sample. A competitive immunoassay may be carried out in the following illustrative manner. A sample, from an animal's body fluid, potentially containing an antibody of interest that is specific for an antigen, is contacted with the antigen attached to the particles and with the anti-antigen antibody conjugated to a detectable label. The antibody of interest, present in the sample, competes with the antibody conjugated to a detectable label for binding with the antigen attached to the particles. The amount of the label associated with the particles can then be determined after separating unbound antibody and the label. The signal obtained is inversely related to the amount of antibody of interest present in the sample.

In an alternative example embodiment of a competitive a sample, an animal's body fluid, potentially containing an analyte, is contacted with the analyte conjugated to a detectable label and with an anti-analyte antibody attached to the particles. The antigen in the sample competes with analyte conjugated to the label for binding to the antibody attached the particles. The amount of the label associated with particles can then be determined after separating unbound antigen and label. The signal obtained is inversely related to the amount of analyte present in the sample.

Antibodies, antigens, and other binding members may be attached to the particles or to the label directly via covalent binding with or without a linker or may be attached through a separate pair of binding members as is well known (e.g., biotin: streptavidin, digoxigenin: anti-digoxiginen). In addition, while the examples herein reflect the use of immunoassays, the paramagnetic, identifiable beads and/or particles and methods of the disclosure may be used in other receptor binding assays, including nucleic acid hybridization assays, which rely on immobilization of one or more assay components to a solid phase.

Testing protocols, including assays, using these solutions are often conducted over a series of agitation events. In practice, the particles (e.g., paramagnetic, identifiable beads) in the solution may bind together (often referred to as "clumping") or bind and/or settle on the bottom or sides of a container. This binding may result in an inconsistent dispersion of particles in the solution, if these particles clump together, they may not be accurately identified or accounted for in the testing protocol (e.g., an assay). This binding and/or clumping, among other issues, may be caused or increased by environmental factors, such as electromagnetic energy, waves, fields, and/or forces. For example, because one or more machines may be used in a laboratory setting (some or all of which may incorporate electrical and/or magnetic components to operate), there may be electromagnetic energy, waves, fields, and/or forces that interact and/or interfere with the plurality of particles (e.g., paramagnetic, identifiable beads) being analyzed. This interference may cause the plurality of particles to behave in a manner that alters and/or negatively impacts the resultant analysis of these particles (e.g., paramagnetic, identifiable beads). In particular, these particles (e.g., paramagnetic, identifiable beads) may be used in a particular testing protocol, including multi-part assays (e.g., multiplex and/or MPX lab tests), which may require the particles to be in a specific orientation to be readable. For example, if paramagnetic, identifiable beads are used in the multi-part assay, each barcode on each bead may need face the reader and/or one or more cameras thereof. Because the beads are paramagnetic, environmental electromagnetic energy, waves, fields, and/or forces can induce the beads to float or stand upright in the container (e.g., plates with multiple wells, cartridges, etc.) such that the barcodes on the beads cannot be accurately and/or consistently read. And, this inability to read barcodes and/or count beads based on this interference can result in low bead count, and can even lead to inability to achieve accurate or consistent assay results.

To help address these issues, a shield may be implemented to, at least, partially surround a reader and associated components (e.g., a platform configured to hold a container, such as a well plate, a cartridge, etc.) to reduce any potential interferences with the particles being analyzed by the reader. If a further aspect, the shield may also reduce any potential interferences with one or more components of the reader and/or the container (e.g., a cartridge) that are used during the analysis of the particles. For example, if one or more magnets are used during the analysis (e.g., to immobilize an identifiable paramagnetic bead during analysis), then the shield can help isolate and focus the magnet force on the particles by reducing any potential interference from forces outside of the shield and/or the reader.

In another example, the cartridge may be utilize a plurality of electrodes that facilitate transportation of a liquid containing plurality of particles and/or the particles themselves on a surface of the cartridge. To do so, in one example embodiment, the cartridge surface may comprise one or more dielectric materials and transport the individual droplets along one or more paths defined by the plurality of electrodes on a printed circuit board (PCB). Such techniques are often referred to as electrowetting on dielectric ("EWOD"). In example embodiments, the dielectric materials may comprise a hydrophobic material, layer, and/or coating disposed on the surface of the PCB and/or plurality of electrodes, the combination of which is referred to herein as the "dielectric cartridge surface" and/or a "path" or "paths" along the dielectric cartridge surface. In example embodiments, a shield may be implemented to, at least, partially surround a reader and the cartridge to reduce any potential interferences with the particles being analyzed by the reader on the surface of the cartridge. If a further aspect, the shield may also reduce any potential interferences with the components of the cartridge that are used during the analysis of the particles. For example, the shield can help isolate and focus the force generated by the plurality of electrodes and/or the dielectric materials on the particles by reducing any potential interference from forces outside of the shield, the cartridge, and/or the reader.

Disclosed herein are devices, systems, and methods for a linear path cartridge for use in systems and applications to perform one or more testing protocols (e.g., assays) using one or more particles and particle types (e.g., paramagnetic, identifiable beads), using a number of different components and techniques (e.g., EWOD).

In some embodiments, manipulation of a plurality of particles (e.g., transportation, immobilization, etc.) in a container can be controlled by a controller and/or other computing devices to create a programmable articulation of the particles (e.g., transportation around a fluidic path on the surface of a cartridge) which can be used in number of ways (e.g., to facilitate the performance of an assay and/or immunoassay). Further, because this manipulation is controlled by a controller and/or other computing device, and programmable, assay protocols and subparts thereof can be finely controlled to meet the needs of the desired testing protocol (e.g., an assay).

In some embodiments, it is beneficial to immobilize the plurality of particles (e.g., paramagnetic, bar-coded beads) for one or more steps in a testing protocol (e.g., and assay). In some embodiments, immobilization of the plurality of particles can be controlled by the at least one magnet. In some example embodiments, the at least one magnet may be a permanent or semi-permanent magnet below or above one or more portions of the container (e.g. below a cartridge surface). In other embodiments, the at least one magnet may be an electric magnet configured to interact with the plurality of particles (e.g., paramagnetic, bar-coded beads) via a controller and/or other computing devices to create a programmable interaction (e.g., transportation of the plurality of particles along a path on a cartridge surface) to promote assay protocols and subparts thereof.

In some embodiments, it is beneficial to protect or otherwise shield the plurality of particles, the container in which they reside (e.g., a well plate, a cartridge), and/or the reader and components thereof (e.g., cameras, magnets, etc.) for one or more steps in an assay. To do so, in some embodiments, the reader and/or the container in which the plurality of particles resides may be covered (or at least partially covered) by a shield made of one or more materials. In some example embodiments, this shield may be made of one or more ferromagnetic materials, including: iron, cobalt, nickel, and/or alloys or combination thereof. In example embodiments, the shield protects the reader and/or the container in which the plurality of particles resides by surrounding these components and reducing interference from forces outside the shield (e.g., electromagnetic energy, waves, fields, and/or forces), but still leave enough space such that one or more components of the reader and/or the container can be clearly utilized or accessed. For example, the shield may have an opening that allows the operator to see a digital display of the reader during the analysis. In some example embodiments, this shield may be made of other materials that minimize unwanted interactions and/or interference with the plurality of particles (e.g., paramagnetic, identifiable beads) and/or components of the reader and/or container (e.g., magnets, electrodes, or any other controller and/or other computing devices during the assay protocols and subparts thereof).

In an example embodiment, various antibodies, antigens, and/or other components may be controlled, mixed, transported, and/or immobilized during the testing protocol (e.g., assays). Using this programmable protocol, antibodies, antigens, and/or other components may be adhered onto one or more surfaces of paramagnetic, identifiable beads (the "assembled particles" and/or "assembled beads"). In a further aspect, one or more analyses may be performed on the assembled beads (or other particles) in the container (e.g., on the surface of a cartridge)—all while being protected by the shield from interference that may affect and/or degrade the assays. In this regard, a user of the devices, systems, and methods disclosed herein can perform complicated, often multi-step protocols, which are often spread over several machines and devices at various stages of the multi-step protocols, using a single instrument/device/system that is protected from unwanted interference by the shield. In one example embodiment, multiplex multiple analyte targets in a single reaction may be performed on a plurality of particles while in a container (e.g., on the surface of the cartridge detailed above), instead of using multiple devices (e.g., shaker plates, pipettes, vials, plates with multiple wells, plate readers, cameras, etc.)—all while being protected from unwanted interference by the shield.

In this regard, by combining the disclosed reader, shield, a platform configured to hold a container (e.g., a well plate, a cartridge, etc.), and plurality of particles (e.g., paramagnetic, identifiable beads) technologies, the concepts described herein provide disclosure for a compact, in clinic, instrument with multiplex capability—all while protecting the devices and particles used in the testing protocols from unwanted interference via a specifically-configured shield. In an example embodiment, by leveraging these technologies, an example system and/or device is described that can have the same convenience as other tabletop devices (e.g., a SNAP® reader and device) but with the increased menu of capabilities for laboratory testing and assay protocols, including multi-part assays (e.g., multiplex and/or MPX lab tests), without the inconvenience and costs of the devices, instruments, and operators typically required for these tests and assays (e.g., liquid handling robots, plates, plate washers, and/or specialized plate readers) and without the interference that this litany of other laboratory testing devices would otherwise create.

In one example, a user may add a sample (e.g., a fecal sample, urine sample, blood sample, etc.) into a container (e.g., a well plate, a cartridge), insert a container into a tabletop instrument/device, and allow the instrument/device to add and/or control other components (e.g., paramagnetic, identifiable beads, solution, antibodies, etc.) in the container, and analyze one or more components to provide one or more results to clinician, physician, and/or patient based on the same, all using the same sample, container, and instrument/device—and all while being protected from unwanted interference by the shield. Importantly, once the user inserts the container into the tabletop instrument device, some (or all) of the manipulation of the components in the container (including the paramagnetic, identifiable beads), and eventual reading of these components are all automated, controlled, and finely-tuned by program instructions executing on a computing device, all of which may be accomplish without user interaction or control.

By doing so, several benefits are realized, including users (e.g., clinicians) having the same high throughput/multiplexing capability of the traditional technologies, including improved test results based on reducing the otherwise recurrent interference with the plurality of particles (most notably paramagnetic, identifiable beads) by forces outside of the sample, cartridge, and instrument/device (such as electromagnetic energy, waves, fields, and/or forces).

Referring now to the figures, FIG. 1 is a simplified block diagram of an example computing device 100 of a system (e.g., those illustrated in FIGS. 2-4, described in further detail below). Computing device 100 can perform various acts and/or functions, such as those described in this disclosure. Computing device 100 can include various components, such as, processor 102, data storage unit 104, communication interface 106, sensor 108, and/or user interface 110. These components can be connected to each other (or to another device, system, or other entity) via connection mechanism 112.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106, sensor 108, and/or user interface 110. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

Sensor 108 can include sensors now known or later developed, including but not limited to camera sensors (e.g., cameras that capture images of a plurality of particles), scanner sensors (e.g., a scanner for reading barcodes on a plurality of particles), light sensors ((e.g., sensors that detect florescence and/or ultraviolet light interaction of one or more particles in a plurality of particles), a motion sensor, a humidity sensor, a temperature sensor, a proximity sensor, a location sensor (e.g., a GPS sensor), time sensors (e.g., a digital clock), and/or a combination of these sensors, among other possibilities. For example, as used herein, a reader may comprise one or more of these example sensors, including one or more cameras, scanner sensors, and/or light sensors controlled by one or more processors to read and/or further analyze a plurality of particles (e.g., using a camera). Further while depicted as being a component of the computing device 100, it should be understood that the sensor 108 can be physically remote from the other components of the computing device 100 (e.g., processor 102, data storage unit 104, communication interface 106, and/or user interface 110) and may be communicatively coupled to the other components of the computing device 100.

User interface 110 can facilitate interaction between computing device 100 and a user of computing device 100, if applicable. As such, user interface 110 can include input components such as a keyboard, a keypad, a mouse, a touch sensitive panel, a microphone, a camera, and/or a movement sensor, all of which can be used to obtain data indicative of an environment of computing device 100, and/or output components such as a display device (which, for example, can be combined with a touch sensitive panel), a sound speaker, and/or a haptic feedback system. More generally, user interface 110 can include hardware and/or software components that facilitate interaction between computing device 100 and the user of the computing device 100.

Computing device 100 can take various forms, such as a workstation terminal, a desktop computer, a laptop, a tablet, a mobile phone, or a controller.

Figure 2A:
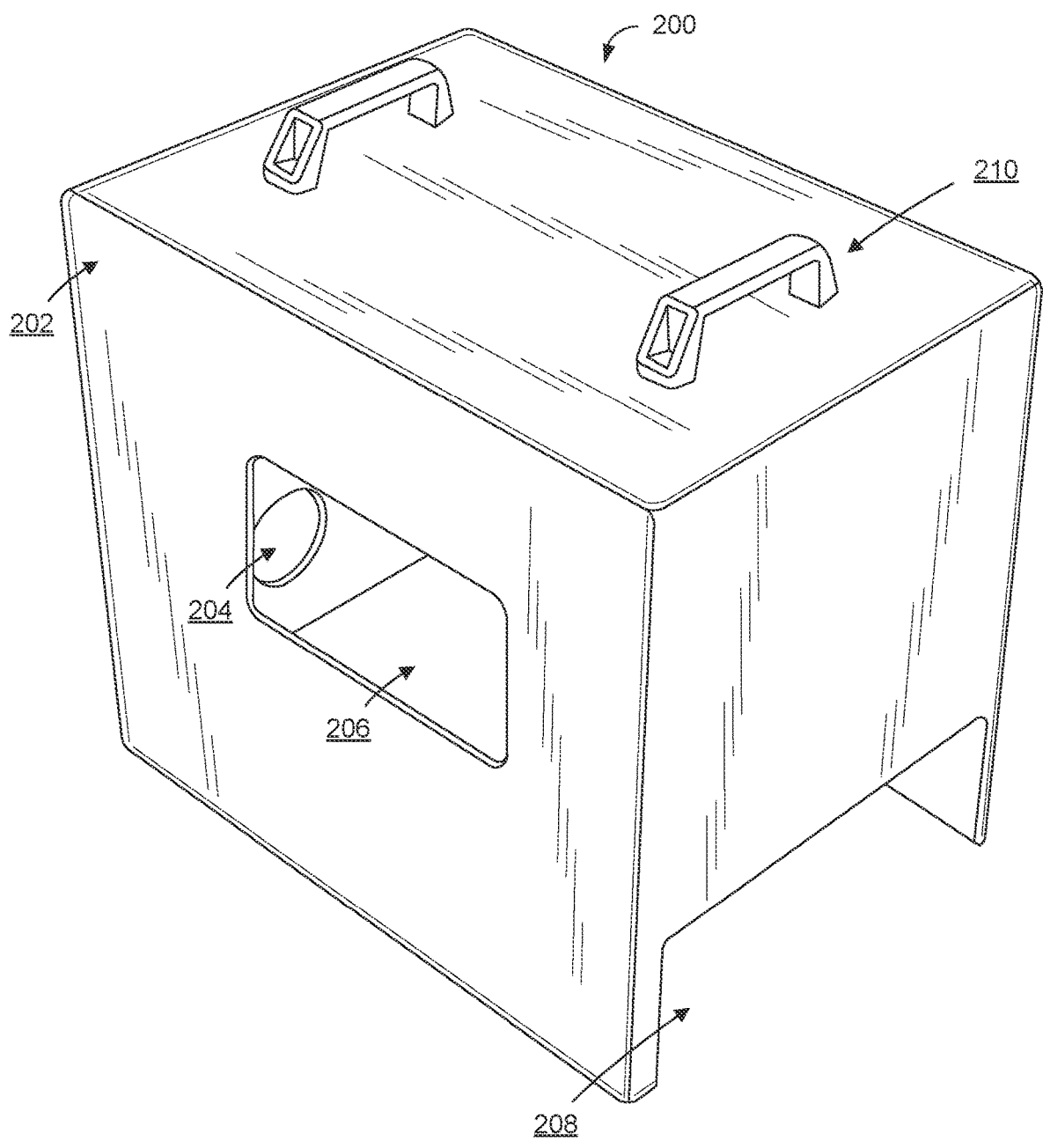
FIG. 2A illustrates a shield of an example system, according to an example embodiment.
Figure 2B:
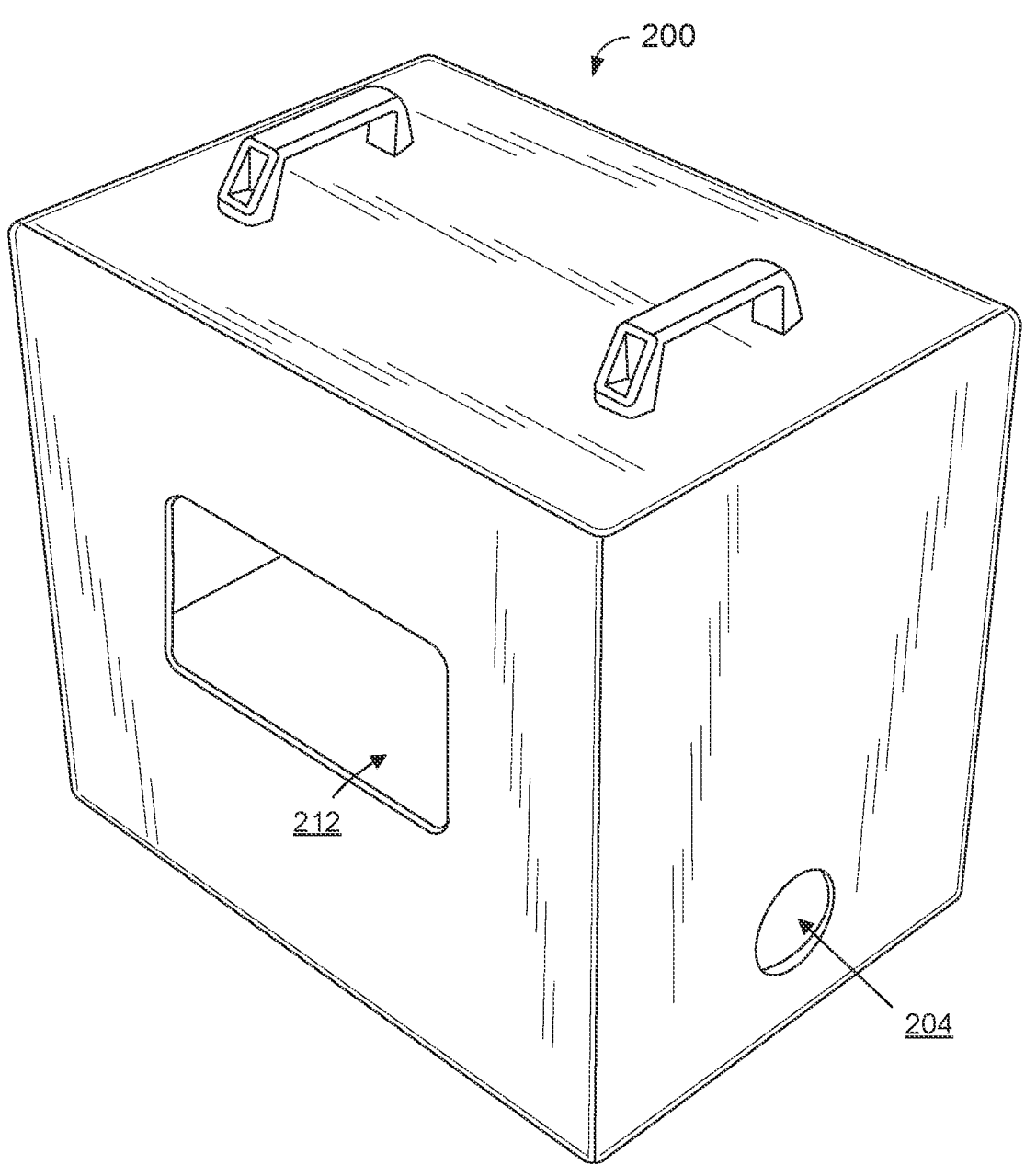
FIG. 2B illustrates the shield of FIG. 3A, from an alternative view, according to an example embodiment.

Turning to FIGS. 2A-2B, a shield 200 is disclosed, according to example embodiments. As illustrated in FIGS. 2A-2B, shield 200 may contain walls 202, one or more of a first aperture 204, a second aperture 206, and a third aperture 208, and handles 210, according to an example embodiment. FIG. 2B illustrates the embodiments in FIG. 2A, from an alternative angle and with a fourth aperture 212.

In examples, the shield is surround (or at least partially surround) a reader that performs one or more testing protocols on a container (e.g., a 96-well plate) containing a plurality of particles (e.g., paramagnetic, identifiable beads). In some examples, the shield 200 is configured to surround a variety of readers and/or components thereof (e.g., a platform configured to hold a container, such as a well plate, a cartridge, etc.), some or all of which may meet Society for Biomolecular Screening ("SBS") standards or other industry standard for laboratory equipment. In the embodiment shown in FIGS. 2A-2B, the shield 200 is configured to partially surround a reader such that various features of the reader can be viewed and/or interacted with while the shield is placed over (and partially covers) the reader. Additionally, although various components of the systems and/or methods described herein may refer to SBS-compliant and/or other brand name components, they are described for the purposes of illustrating example embodiments and other, additional components may be utilized.

For example, although walls 202, first aperture 204, second aperture 206, third aperture 208, and handles 210 are illustrated in FIGS. 2A-2B in a specific configuration, each component may be implemented in various proportions compared to the embodiments illustrated in FIGS. 2A-2B. For example, the walls 202, first aperture 204, second aperture 206, third aperture 208, and handles 210 may be taller or shorter than the embodiments illustrated in FIGS. 2A-2B (e.g., to accommodate readers of different proportions and/or features). In some embodiments the walls 202, first aperture 204, second aperture 206, third aperture 208, and handles 210 may incorporate one or more additional materials to provide additional functionality. For example, walls 202 may be made of one or more ferromagnetic materials, but also lined with a rubber and/or foam that might allow the shield to more securely seat on the reader compared to walls that do not include a liner. Additionally, these materials lining the walls 202 may absorb one or more mechanical actions (e.g., shaking) of the reader or other components during the testing protocols, thereby reducing transfer of mechanical energy to the containers of the plurality of particles during testing events. For example, in some embodiments, the platform configured to hold a container may be a shaker plate configured to hold one or more specifically configured containers (e.g., a 96-well plate) and the liner materials may help reduce the mechanical vibrations caused by the shaker plate. In another example embodiment, the platform configured to hold a container may be a receiver configured to receive and hold one or more specifically configured cartridges and the liner materials may help reduce the mechanical vibrations caused by the receiver.

In some examples, the first aperture 204, second aperture 206, and/or third aperture 208 may configured in a number of ways to facilitate different functionalities of a particular reader and/or other readers of different sizes, brand, etc. For example, although the first aperture 204 of shield 200 is shown as circular (to facilitate a user's ability to interact with a power switch on an example reader), this aperture may take a different shape (e.g., oval, square) and/or be located on a different wall in one or more other configurations. In a further example, although the second aperture 206 of shield 200 is shown as rectangular (to facilitate a user's ability to insert and/or remove an example container of particles to be tested by an example reader), this aperture may take a different shape and/or be located on a different wall in one or more other configurations. In a further example, although the third aperture 208 of shield 200 is shown as rectangular (to facilitate a power cord, fan, and/or other electrical and/or mechanical components of an example reader), this aperture may take a different shape and/or be located on a different wall in one or more other configurations. For example, if these components (e.g., the power cord) were guided through the surface on which the reader sits and/or operates (e.g., a table top with a perforation for the power cord), then the third aperture may be reduced in size or removed from the shield 200, altogether. Other examples are possible.

Turning to FIG. 2A, fourth aperture 212 may configured in a number of ways to facilitate different functionalities of a particular reader and/or other readers of different sizes, brand, etc. For example, although the second aperture 206 of shield 200 is shown as rectangular (to facilitate a robotic arm's ability to insert and/or remove an example container of particles to be tested by an example reader), this aperture may take a different shape and/or be located on a different wall in one or more other configurations.

In a further aspect, although not specifically illustrated in FIGS. 2A and 2B, each, some, or all of the first aperture 204, second aperture 206, third aperture 208, and/or fourth aperture 212 may be open while the user and/or a robotic arm interacts with the reader in preparation for testing (e.g., when the container is placed in the reader), but then covered during the actual testing protocol (e.g., by a lid or hinged covering that is approximately the same size as the aperture and/or made of a ferromagnetic material).

In examples, a controller (such as the computing device 100 illustrated in FIG. 1) can execute a program that causes the reader to perform a series of testing events by way of a non-transitory computer-readable medium having stored program instructions. These program instructions include, for example, capturing of one or more images of the plurality of particles, as well as process the plurality of images to generate and/or annotate a composite image of the plurality of images.

In examples, shield 200 may surround (or at least partially surround) the reader while the reader performs assay testing on a plurality of assembled particles (e.g., an assembled paramagnetic, identifiable bead). In example embodiments, the reader may detect, shortly after the assembled particle is complete, an assay read signal corresponding to at least one of the assembled particles in the container of particles in the reader. In an example embodiment, an optics system reader may be employed to decode the individual bar codes of paramagnetic, bar-coded beads, all while surrounded by shield 200. In a further aspect, because the paramagnetic, bar-coded beads are not subject to interference from electromagnetic forces outside of shield 200, the resultant testing protocols will be improved, including while reading other parameters of the plurality of particles containing the assembled beads and/or the assembled beads themselves (e.g., by applying an ultraviolet light and reading the fluorescence of the assembled beads via a fluorophore detector). In particular, in some embodiments, optical identification of the identifying features (i.e., barcodes) of the assembled beads may require that the beads are adjacent to and/or in contact with wall of the well or cartridge with little or no intervening fluid obscuring the identifying features. Further, the identifying features, in some embodiments, must be facing the walls of the well or cartridge to be properly interrogated. By restricting external electromagnetic interference, the assembled beads can contact the wall of the well or cartridge in the proper orientation (e.g., with the identifying features facing the walls of the well or cartridge) without being induced to float or face opposite the walls by the external electromagnetic interference.

Additionally, in some example embodiments, the one or more components of the reader may provide feedback to a user/operator through one or more apertures of the shield 200, including a graphical representation of a detected parameter, a test result, and/or the like, via a user interface of the controller and/or the tabletop device to provide information to the user. And, as discussed in further detail above, the shield that surrounds the components of this system and/or device may be configured so that the operator may view and/or otherwise receive the feedback without removing the shield.

Additionally, in some example embodiments, the one or more components illustrated in FIGS. 2A and 2B, the controller illustrated in FIG. 1, and/or other components of the illustrated system may provide feedback to a user/operator, including a graphical representation of a detected parameter, a test result, and/or the like, via a user interface of the controller and/or the tabletop device to provide information to the user-all without losing the analytical benefits of the shield. Other examples are possible.

Figure 3:
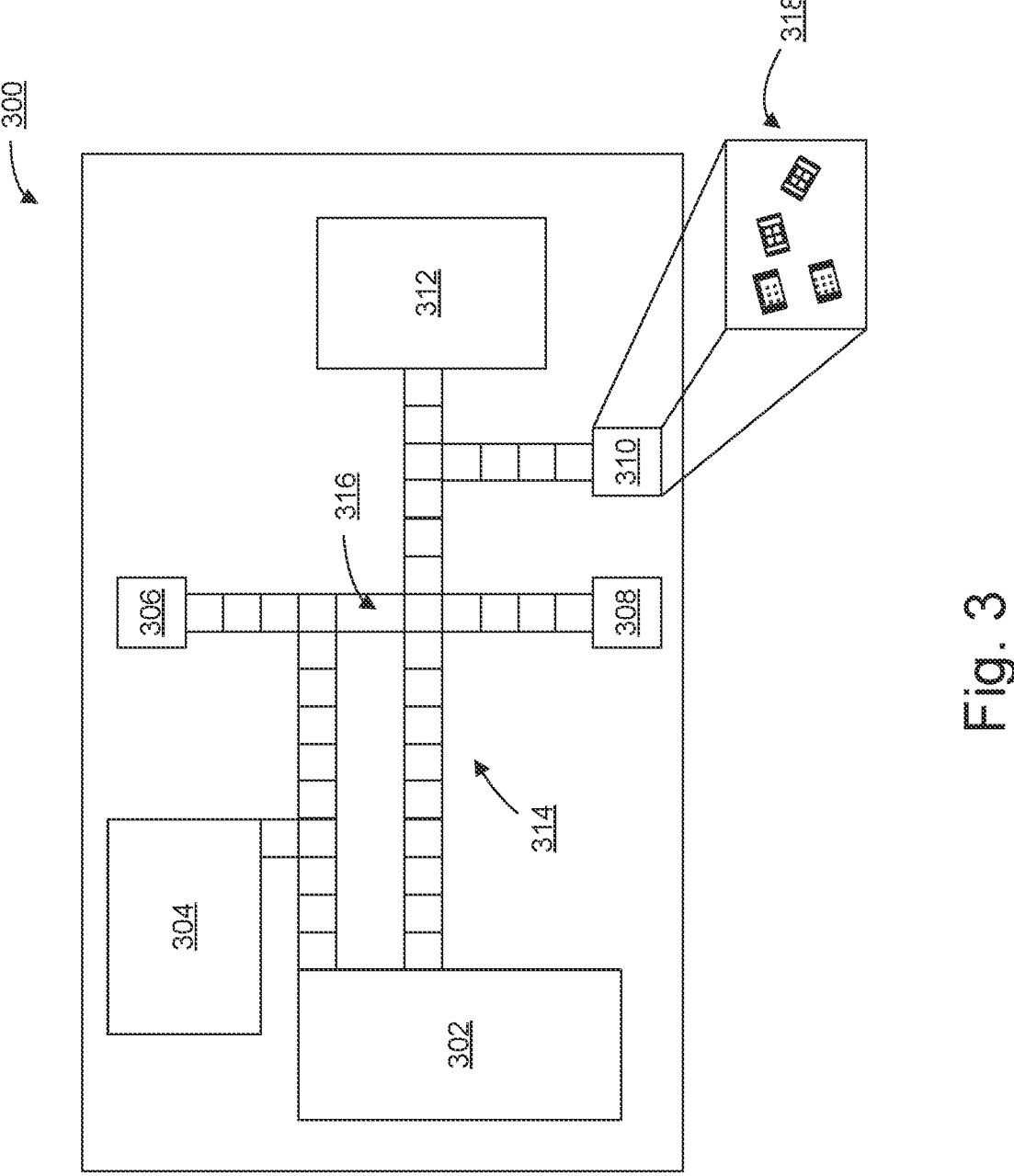
FIG. 3 illustrates a cartridge of an example system, according to an example embodiment.

Now referring to FIG. 3, a cartridge 300 is disclosed, which includes a sample reservoir 302, a solution reservoir 304, a paramagnetic, identifiable bead reservoir 306, an assay component reservoir 308, a testing reservoir 310, and a waste reservoir 312, all of which reside on the dielectric cartridge surface 314, according to an example embodiment. In this example embodiment, paramagnetic, identifiable bead reservoir contains the illustrated plurality of paramagnetic, bar-coded beads. In this example embodiment, a plurality of electrodes and at least one magnet are disposed along various portions of dielectric cartridge surface 314. As noted above, this plurality of electrodes facilitates transportation of a fluid droplet containing at least one paramagnetic, bar-coded bead along dielectric cartridge surface 314, and the at least one magnet immobilizes the fluid droplet and/or components thereof (e.g., at least one paramagnetic, bar-coded bead). For clarity, as illustrated in FIG. 3, the term "dielectric cartridge surface 314" as used in FIG. 3 includes the cartridge surfaces below the illustrated sample reservoir 302, a solution reservoir 304, a paramagnetic, identifiable reservoir 306, an assay component reservoir 308, a testing reservoir 310, and a waste reservoir 312, as well as the illustrated path that connects all of these components in FIG. 3.

In examples, the cartridge 300 and/or any components thereof may interact with a computing device, such as computing device 100. As described above, a computing device 100 can be implemented as a controller, and a user of the controller can use the controller to program and/or control cartridge 300 and/or any components thereof. The cartridge 300 and/or any components thereof may communicably coupled with a controller, such as computing device 100, and may communicate with the controller by way of a wired connection, a wireless connection, or a combination thereof. Further, as described above, a controller may be configured to control various aspects of the illustrated cartridge 300 and testing protocols (e.g., assays) utilizing cartridge 300 and/or any components thereof. Although various cartridge components and arrangements of these components a are provided for explanatory purposes, and different shapes, amounts, and/or types of beads, particles, and/or components may be used.

In examples, the controller can execute a program that cause one or more components of the cartridge 300 to perform a series of events to by way of a non-transitory computer-readable medium having stored program instructions. These program instructions include, for example, applying voltage and/or current to a plurality of electrodes near (e.g., below) the dielectric materials of dielectric cartridge surface 314 to manipulate paramagnetic, bar-coded beads and/or any fluid or other substance in which the paramagnetic, bar-coded bead may reside along the dielectric cartridge surface 314. In some examples, the plurality of electrodes may be used to transport one or more droplets of fluid containing the paramagnetic, bar-coded bead between the illustrated components of FIG. 3 and/or manipulate the one or more droplets and/or components thereof at one more portions of the dielectric cartridge surface 314. For example, controller may apply a direct current to the plurality of electrodes in a succession of on/off voltage/current bursts, which may result in the droplet alternating between an elongated form on the dielectric surface (when the voltage/current is applied to an electrode near the droplet) and a non-elongated form on the dielectric surface (when the voltage/current is not applied to an electrode near the droplet). This oscillation of on/off voltage/current bursts and the associated form the droplet takes during each event, may be useful for mixing the components within the droplet. Certain voltages/currents amplitudes and patterns, as well as electrode placement around the surface of the dielectric cartridge surface 314 may more effectively agitate the droplet to produce more accurate and consistent paramagnetic, bar-coded bead and particle mixing and associated assay results than other methods. For example, if a direct current is applied to electrodes proximate to droplet containing paramagnetic, bar-coded beads, because of the paramagnetic properties of the beads, the beads may align with the direct current and stay stationary on the surface of the dielectric cartridge surface 314. Alternatively, if an alternating current is applied to electrodes proximate to droplet containing paramagnetic, bar-coded beads, because of the paramagnetic properties of the beads, the beads may align with the direct current and alternate between two or more positions on the surface of the dielectric cartridge surface 314 based on the alternating current. Other examples are possible and it should be appreciated that complex and novel fluidic functions can be performed because of the processor-controlled fluidics.

In some embodiments, although specifically illustrated in FIG. 3, it is beneficial to protect or otherwise shield the cartridge 300, as well as the reader and components thereof (e.g., cameras, etc.), for one or more steps in an assay to reduce interference with some or all of the processes in the testing protocol that may be adversely effected by forces outside the shield (e.g. electromagnetic energy, waves, fields, and/or forces). To do so, in some embodiments, the reader and cartridge may be covered (or at least partially covered) by a shield made of one or more materials, such as the shield illustrated in FIGS. 2A and 2B, among other possibilities. In some example embodiments, this shield may be made of one or more ferromagnetic materials, including: iron, cobalt, nickel, and/or alloys or combination thereof. In example embodiments, the shield protects the reader and cartridge 300 by surrounding these components and reducing interference from forces outside the shield (e.g. electromagnetic energy, waves, fields, and/or forces), but still leave enough space such that one or more components of the reader and/or cartridge can be clearly seen and/or otherwise utilized. For example, the shield may have an opening that allows the operator to view the paramagnetic, bar-coded bead manipulation on the surface of cartridge 300, as well as a digital display of the reader during the analysis. Other examples are possible.

For example, the controller program instructions can include moving various fluids around the surface of the cartridge and perform various aspects of an assay, all on the surface of the cartridge and all in an automated (or largely automated) procedure.

In example embodiments, a plurality of electrodes of cartridge 300 may transport a droplet containing paramagnetic, bar-coded beads on the dielectric cartridge surface 314. In examples, the paramagnetic, bar-coded beads may be introduced into a droplet, either in a liquid suspension or dried onto a surface of the cartridge 300 and rehydrated. In one example, the paramagnetic, bar-coded beads may be suspended in buffer solution containing sucrose, removed from the suspension, and dried before being stored in paramagnetic, identifiable bead reservoir 306. In examples, the dried paramagnetic, bar-coded beads may be rehydrated with one or more solutions containing one or more components (e.g., reagents, sample, or both, among other possibilities) before being used in one or more aspects of an assay. In example embodiments, once the paramagnetic, bar-coded beads are rehydrated and/or introduced into a fluidic droplet, the droplet containing paramagnetic, bar-coded beads may be transported from paramagnetic, identifiable bead reservoir 306 to sample reservoir 302 to be mixed with a sample residing in sample reservoir (e.g., a fecal sample, urine sample, blood sample, etc.).

In other example embodiments, the dried paramagnetic, bar-coded beads may be stored in the sample reservoir 302 and rehydrated with solution from solution reservoir 304, liquid that accompanies the sample upon introduction to sample reservoir 302 (e.g., urine), or both, among other possibilities.

In a further aspect, in example embodiments, the plurality of electrodes may transport a droplet of assay components (e.g., containing antibodies, antigens, labels, and/or other binding members) on the dielectric cartridge surface 314. In examples, these assay components may be introduced into a droplet, either in a liquid suspension or dried onto a surface of the cartridge 300 and rehydrated. Either way, once the paramagnetic, bar-coded beads are introduced into the droplet, a droplet containing paramagnetic, bar-coded beads may be transported from paramagnetic, assay component reservoir 308 to sample reservoir 302 to be mixed with a sample residing in sample reservoir.

In other example embodiments, one or more particular assay components (e.g., antibodies) may be dried and stored in the sample reservoir 302, perhaps with the dried paramagnetic, bar-coded beads, and rehydrated in the sample reservoir with solution from solution reservoir 304, liquid that accompanies the sample upon introduction to sample reservoir 302 (e.g., urine), or both, among other possibilities. In a further aspect, in this example embodiment, one or more additional assay components (e.g., reagents, fluorescent labels/tags, etc.) may be stored assay component reservoir 308 and transported on the dielectric cartridge surface to the sample reservoir 302 to be mixed with the one or more particular assay components, paramagnetic, bar-coded beads, and/or sample.

Furthermore, although assay component reservoir 308 is illustrated as a single reservoir in FIG. 3, it should be apparent to a person of ordinary skill in the art that assay component reservoir 308 may comprise multiple, separate reservoirs, each of which may contain a particular assay components or combination thereof (e.g., a particular antibodies, antigens, labels, and/or other binding members). Additionally or alternatively, although specifically illustrated in FIG. 3, there may be multiple assay component reservoirs in cartridge 300, each with their own associated assay component and/or path on the dielectric cartridge surface 314.

In example embodiments, a variety of techniques can be used facilitate the mixing of the sample, the paramagnetic, bar-coded beads, and the assay component in the sample reservoir 302. In some examples, a plurality of electrodes disposed near the sample reservoir 302 may be employed to circulate and/or otherwise manipulate the fluidics of the components in the sample reservoir 302, including a droplet of fluid containing paramagnetic, bar-coded beads, the sample (which may contain liquids), the assay components, and/or combinations thereof, among other possibilities.

For example, one or more magnets disposed near the sample reservoir 302 may be employed to immobilize the droplet containing paramagnetic, bar-coded beads, while the plurality of electrodes can be used in connection with the magnets to otherwise manipulate the fluidics of the other components in the sample reservoir 302, including the droplet containing paramagnetic, bar-coded beads, the sample (which may contain liquids), the assay components, and/or combination thereof, among other possibilities. These magnets may be part of the reader, the cartridge, or another device of this disclosure, and may be used in a variety of ways. For example, one or more mixing beads may also reside in the sample reservoir 302, which may be controlled by the magnets, the electrodes, or both to further facilitate mixing the components in the sample reservoir 302 at various mixing speeds, patterns, etc., all of which may be controlled by the controller executing program instructions controlling the components of the cartridge 300.

In example embodiments, once the droplet containing paramagnetic, bar-coded beads, the sample, and/or other assay components is sufficiently mixed, all of these components may incubate in the sample reservoir 302 (e.g., to allow attachment of one or more assay components and/or components of the sample to attach to the paramagnetic, bar-coded beads). In example embodiments, once the incubation is complete, the paramagnetic, bar-coded beads and the attached sample and/or assay components (collectively, the "assembled particles" and/or "assembled beads") may be immobilized in the sample reservoir 302 (e.g., using a magnet) while the fluids in the sample reservoir 302 may be transported to waste reservoir 312 along dielectric cartridge surface 314 (e.g., using a plurality of electrodes).

After the fluids are removed from the sample reservoir 302, a solution (e.g., a washing solution) may be transported from solution reservoir 304 to sample reservoir 302 to wash excess debris and/or other components from the assembled beads contained in sample reservoir 302. In example embodiments, this solution may interact with the assembled beads based on fluidics controlled by the plurality of electrodes transporting the solution fluid over immobilized assembled beads, or via a mixing protocol with the assembled beads (such as the mixing steps described above). Once the excess debris and/or other components are washed from the assembled beads, the solution (and any other excess fluids) may be transported from sample reservoir 302 to waste reservoir 312 along dielectric cartridge surface 314 (e.g., using a plurality of electrodes), as the assembled beads remain in the sample reservoir 302 (e.g., via immobilization).

In other examples, this sequence of transporting the paramagnetic, bar-coded beads and/or the assembly components to the sample reservoir, mixing in the sample reservoir, and transporting solution to and from to the sample reservoir may be repeated a number of times. Additionally or alternatively, one or more assembly components may be transported to be mixed with the paramagnetic, bar-coded beads and/or other assembly components after certain steps of the assay have been completed. For example, a first assembly component (e.g., an antibody) may be mixed with the paramagnetic, bar-coded beads and sample, then, after washing, a second assembly component may be transported into the sample reservoir 302 (e.g., a label) to complete another portion of the assembly protocol for the assembled beads.

In a further aspect, although the mixing protocols have been discussed in connection with sample reservoir 302, it should be appreciated that these mixing protocols can occur in other parts of the illustrated cartridge 300, including dielectric cartridge surface portion 316. Other examples are possible.

In examples, once the assembled beads are completed and ready for analysis, the assembled beads may be transported to a portion of the cartridge for analysis, including testing reservoir 310. In example embodiments, the assembled beads may be transported via fluidic transportation across the dielectric cartridge surface 314, via magnet force (i.e., moving the paramagnetic beads across the across the dielectric cartridge surface 314 based on interaction with one or more magnets), or both, among other possibilities.

In examples, testing reservoir 310 provides a predetermined location for a reader to conduct the assay testing on the assembled bead. In example embodiments, the reader may detect, shortly after the assembled bead is complete, an assay read signal corresponding to at least one of the assembled beads in the testing reservoir. In some example embodiments, this detection may occur within a predetermined time period after assembly is complete and by starting the assay read shortly after the conclusion of the assembly, the assay provides a more accurate result. In an example embodiment, an optics system reader may be employed to decode the individual bar codes of the paramagnetic, bar-coded beads. In other examples, a plurality of electrodes and/or one or more magnets may be used to manipulate the paramagnetic, bar-coded beads while reading other parameters of the droplet containing the assembled beads and/or the assembled beads themselves (e.g., by applying an ultraviolet light and reading the fluorescence of the assembled beads via a fluorophore detector). As illustrated in FIG. 2, exploded view 318 provides an example view of paramagnetic, bar-coded beads, and it should be appreciated that this analysis (e.g., reading) could occur at other portions of the cartridge 300, including dielectric cartridge surface portion 316.

Additionally, in some example embodiments, the one or more components of the reader may provide feedback to a user/operator, including a graphical representation of a detected parameter, a test result, and/or the like, via a user interface of the controller and/or the tabletop device to provide information to the user. And, as discussed in further detail above, the shield that surrounds the components of this system and/or device may be configured so that the operator may view and/or otherwise receive the feedback without removing the shield.

Additionally, in some example embodiments, the one or more components of the cartridge illustrated in FIG. 3, the shield illustrated in FIGS. 2A and 2B, the controller illustrated in FIG. 1, and/or other components of the illustrated system may provide feedback to a user/operator, including a graphical representation of a detected parameter, a test result, and/or the like, via a user interface of the controller and/or the tabletop device to provide information to the user—all without losing the analytical benefits of the shield. Other examples are possible.

Example Methods and Aspects

Now referring to FIG. 4, an example method of analyzing a plurality of particles is disclosed.

Method 400 shown in FIG. 4 presents an example of a method that could be used with the components shown in FIGS. 1-3, for example. Further, devices or systems may be used or configured to perform logical functions presented in FIG. 4. In other examples, components of the devices and/or systems may be arranged to be adapted to, capable of, or suited for performing the functions, such as when operated in a specific manner. Method 400 may include one or more operations, functions, or actions as illustrated by one or more of blocks 402-404. Although the blocks are illustrated in a sequential order, these blocks may also be performed in parallel, and/or in a different order than those described herein.

Also, the various blocks may be combined into fewer blocks, divided into additional blocks, and/or removed based upon the desired implementation.

At block 402, method 400 includes imaging a plurality of particles in a container, wherein the plurality of particles comprises at least one paramagnetic, identifiable bead.

In some example embodiments, the at least one paramagnetic, identifiable bead comprises one or more unique bar codes. In other examples, the at least one paramagnetic, identifiable bead comprises at least one, paramagnetic, identifiable bead. In some examples, the at least one paramagnetic, identifiable bead is between approximately 0.1 and 100 microns in diameter.

At block 404, method 400 involves analyzing, via a reader, the plurality of particles in the container, wherein analyzing the plurality of particles comprises performing one or more assay procedures on the plurality of particles and, during the one or more assay procedures, determining a parameter of the plurality of particles, and wherein a shield at least partially surrounds the container and the reader, and wherein the shield comprises a material that restricts transmission of electromagnetic waves through the shield.

In some examples, method 400 further comprises manipulating the plurality of particles in the container. In some examples, the container is a cartridge, and manipulating the plurality of particles in the container comprises manipulating the plurality of particles on a surface of the cartridge, and analyzing, via the reader, the plurality of particles in the container comprises analyzing, via the reader, the plurality of particles on the surface of the cartridge. In some examples, the surface of the cartridge comprises a dielectric material, and manipulating the plurality of particles on the surface of the cartridge comprises applying an electric current to the electrodes of the cartridge. In some examples, the electrical current comprises a direct electric current. In some examples, the electrical current comprises an alternating electric current. In some examples, manipulating the plurality of particles on the surface of the cartridge comprises immobilizing, via at least one magnet of the cartridge, the at least one paramagnetic, identifiable bead of the plurality of particles on the surface of the cartridge.

In examples, the container comprises a cartridge and analyzing the plurality of particles on the surface of the cartridge comprises analyzing the plurality of particles on the surface of the cartridge while the plurality of particles is manipulated via the plurality of electrodes of the cartridge. In some examples, analyzing the plurality of particles on the surface of the cartridge comprises analyzing the plurality of particles on the surface of the cartridge while the at least one paramagnetic, identifiable bead of the plurality of particles is immobilized on the surface of the cartridge.

In some examples, analyzing the plurality of particles comprises generating, via one or more cameras of the reader, an image of the plurality of particles on the surface of the cartridge, wherein the image comprises an image of the plurality of particles and, based on the generated image, determining a parameter of the plurality of particles.

In some examples, analyzing the plurality of particles comprises generating, via one or more cameras of the reader an image of the plurality of particles on the surface of the cartridge, wherein the image comprises an image of the at least one paramagnetic, identifiable bead and, based on the generated image, determining a parameter of the plurality of particles. In some examples, determining a parameter of the plurality of particles comprises comparing the generated image of the plurality of particles to a previously generated image of the plurality of particles. In some examples, analyzing the plurality of particles further comprises, while generating the image of the plurality of particles on the surface of the cartridge, applying an ultraviolet light to the plurality of particles. In some examples, analyzing the plurality of particles comprises generating, via one or more cameras of the reader, a composite image of the plurality of particles on the surface of the cartridge, wherein the composite image comprises a plurality of images of the at least one paramagnetic, identifiable bead of the plurality of particles and, based on the generated composite image, determining a parameter of the plurality of particles.

In some examples, determining a parameter of the plurality of particles comprises identifying a particular feature of plurality of particles.

In some examples, analyzing the plurality of particles comprises performing a plurality of assay procedures on the plurality of particles, and wherein, during the one or more assay procedures, determining a presence of one or more analytes adhered to the at least one paramagnetic, identifiable bead of the plurality of particles.

In some examples, analyzing the plurality of particles comprises performing a plurality of assay procedures on the plurality of particles, and wherein, during the one or more assay procedures, determining a presence of a first group of particles of the plurality of particles associated with a first assay and a second group of particles of the plurality of particles associated with a second assay. In some examples, the first group comprises a first paramagnetic, identifiable bead associated with the first assay and the second group comprises a second paramagnetic, identifiable bead associated with the second assay.

In some example, the container is a well plate, and manipulating the plurality of particles in the container comprises manipulating the plurality of particles in the well plate, and analyzing, via the reader, the plurality of particles in the container comprises analyzing, via the reader, the plurality of particles in the well plate.

In some examples, the shield comprises a ferromagnetic material.

In some examples, the method 400 includes transmitting instructions that cause a graphical user interface to display a graphical representation of the determined parameter of the plurality of particles.

In one aspect, a non-transitory computer-readable medium, having stored thereon program instructions that, upon execution by a controller, cause a controller to perform a set of operations comprising manipulating a plurality of particles in a container, wherein the plurality of particles comprises at least one paramagnetic, identifiable bead and analyzing, via a reader, the plurality of particles in the container, wherein analyzing the plurality of particles comprises performing one or more assay procedures on the plurality of particles and, during the one or more assay procedures, determining a parameter of the plurality of particles, and wherein a shield at least partially surrounds the platform, the container, and the reader, and wherein the shield comprises a material that restricts transmission of electromagnetic waves through the shield, is disclosed.

The singular forms of the articles "a," "an," and "the" include plural references unless the context clearly indicates otherwise. For example, the term "a compound" or "at least one compound" can include a plurality of compounds, including mixtures thereof.

Various aspects and embodiments have been disclosed herein, but other aspects and embodiments will certainly be apparent to those skilled in the art. Additionally, the various aspects and embodiments disclosed herein are provided for explanatory purposes and are not intended to be limiting, with the true scope being indicated by the following claims.

What is claimed is:

1. A system for analyzing a plurality of particles, the system comprising:

a platform structurally configured to support a container;

a reader;

one or more processors; and a non-transitory, computer-readable medium storing instructions that, when executed by the one or more processors, cause the system to perform a set of operations comprising:

analyzing, via the reader, a plurality of particles in the container, the plurality of particles comprising at least one paramagnetic, identifiable bead, in the container, wherein analyzing the plurality of particles comprises performing one or more assay procedures on the plurality of particles and, during the one or more assay procedures, determining a parameter of the plurality of particles; and a shield, wherein the shield comprises a material that restricts transmission of electromagnetic waves through the shield, and wherein the shield at least partially surrounds the platform, the container, and the reader.

2. The system of claim 1, wherein the at least one paramagnetic, identifiable bead comprises at least one paramagnetic, bar-coded bead comprising one or more unique bar codes.

3. The system of claim 1, wherein the at least one paramagnetic, identifiable bead is between approximately 0.1 to 100 microns in diameter.

4. The system of claim 1, wherein the set of operations further comprises manipulating the plurality of particles in the container, and wherein the container is a cartridge, and wherein manipulating the plurality of particles in the container comprises manipulating the plurality of particles on a surface of the cartridge, and wherein analyzing, via the reader, the plurality of particles in the container comprises analyzing, via the reader, the plurality of particles on the surface of the cartridge.

5. The system of claim 4, wherein the surface of the cartridge comprises a dielectric material, and wherein manipulating the plurality of particles on the surface of the cartridge comprises applying an electric current to a plurality of electrodes of the cartridge.

6. The system of claim 5, wherein the electrical current comprises a direct electric current.

7. The system of claim 5, wherein the electrical current comprises an alternating electric current.

8. The system of claim 6, wherein manipulating the plurality of particles on the surface of the cartridge comprises immobilizing, via at least one magnet of the cartridge, the at least one paramagnetic, identifiable bead of the plurality of particles on the surface of the cartridge.

9. The system of claim 1, wherein analyzing the plurality of particles comprises generating, via one or more cameras of the reader an image of the plurality of particles in the container, wherein the image comprises an image of the at least one paramagnetic, identifiable bead; and based on the generated image, determining a parameter of the plurality of particles.

10. The system of claim 9, wherein determining a parameter of the plurality of particles comprises comparing the generated image of the plurality of particles to a previously generated image of the plurality of particles.

11. The system of claim 9, wherein analyzing the plurality of particles further comprises, while generating the image of the plurality of particles in the container, applying an ultraviolet light to the plurality of particles.

12. The system of claim 1, wherein the set of operations further comprises:

transmitting instructions that cause a graphical user interface to display a graphical representation of the determined parameter of the plurality of particles.

13. The system of claim 1, wherein the container is a well plate.

14. The system of claim 1, wherein analyzing the plurality of particles comprises performing a plurality of assay procedures on the plurality of particles, and wherein, during the one or more assay procedures, determining a presence of one or more analytes adhered to the at least one paramagnetic, identifiable bead of the plurality of particles.

15. The system of claim 1, wherein analyzing the plurality of particles comprises performing a plurality of assay procedures on the plurality of particles, and wherein, during the one or more assay procedures, determining a presence of a first group of particles of the plurality of particles associated with a first assay and a second group of particles of the plurality of particles associated with a second assay.

16. The system of claim 15, wherein the first group comprises a first paramagnetic, identifiable bead associated with the first assay and the second group comprises a second paramagnetic, identifiable bead associated with the second assay.

17. The system of claim 1, wherein the shield comprises a ferromagnetic material.

18. The system of claim 17, wherein the shield further comprises a rubber material.

19. A method for analyzing a plurality of particles, the method comprising:

imaging a plurality of particles in a container, wherein the plurality of particles comprises at least one paramagnetic, identifiable bead; and analyzing, via a reader, the plurality of particles in the container, wherein analyzing the plurality of particles comprises performing one or more assay procedures on the plurality of particles and, during the one or more assay procedures, determining a parameter of the plurality of particles, and wherein a shield at least partially surrounds the container and the reader, and wherein the shield comprises a material that restricts transmission of electromagnetic waves through the shield.

20. A non-transitory computer-readable medium, having stored thereon program instructions that, upon execution by a controller, cause a controller to perform a set of operations comprising:

manipulating a plurality of particles in a container, wherein the plurality of particles comprises at least one paramagnetic, identifiable bead; and analyzing, via a reader, the plurality of particles in the container, wherein analyzing the plurality of particles comprises performing one or more assay procedures on the plurality of particles and, during the one or more assay procedures, determining a parameter of the plurality of particles, and wherein a shield at least partially surrounds the container and the reader, and wherein the shield comprises a material that restricts transmission of electromagnetic waves through the shield.

* * * * *